United States Patent [19]
Maehara

[11] Patent Number: 4,690,545
[45] Date of Patent: Sep. 1, 1987

[54] COPYING APPARATUS

[75] Inventor: Sigeharu Maehara, Nara, Japan

[73] Assignee: Sharp Kabushiki Kaisha, Japan

[21] Appl. No.: 881,657

[22] Filed: Jul. 3, 1986

[30] Foreign Application Priority Data

Jul. 5, 1985 [JP] Japan .................................. 60-148782

[51] Int. Cl.⁴ ...................... G03B 27/48; G03B 27/50; G03B 27/70
[52] U.S. Cl. ........................................ 355/51; 355/8; 355/14 R; 355/57
[58] Field of Search .............. 355/8, 11, 3 SH, 14 SH, 355/14 R, 51, 57

[56] References Cited

U.S. PATENT DOCUMENTS

| | | | |
|---|---|---|---|
| 4,413,900 | 11/1983 | Abe et al. | 355/8 |
| 4,420,246 | 12/1983 | Nonaka et al. | 355/8 X |
| 4,461,564 | 7/1984 | Ikenoue | 355/8 |
| 4,589,763 | 5/1986 | Fujiwara | 355/14 SH X |
| 4,627,708 | 12/1986 | Arai et al. | 355/8 X |
| 4,645,328 | 2/1987 | Shiraki et al. | 355/8 |

Primary Examiner—Richard A. Wintercorn
Attorney, Agent, or Firm—Birch, Stewart, Kolasch & Birch

[57] ABSTRACT

A copying apparatus including an original scanning device such that relative positions of a leading edge of a copy paper sheet and a front end of an image to be copied are controlled in accordance with a time interval between a point of time at the start of scanning of the original scanning device and a point of time at the start of transport of the copy paper sheet. The copying apparatus further includes a device for reciprocating, in a mode for starting scanning of the original scanning device after the start of transport of the copy paper sheet, the original scanning device through a short distance at a low speed prior to the start of copying of the image onto the copy paper sheet so as to determine a start position of scanning of the original scanning device.

3 Claims, 15 Drawing Figures 4,690,545

COPYING APPARATUS

BACKGROUND OF THE INVENTION

The present invention generally relates to copying apparatuses and more particularly, to a copying apparatus including an original scanning means including a reciprocating optical unit and a reciprocating original platform, in which relative positions of a leading edge of a copy paper sheet and a front end of an image to be copied are controlled in accordance with a time interval between a point of time at the start of scanning of the original scanning means and a point of time at the start of transport of the copy paper sheet.

Conventionally, it has been so arranged that when an image of an original document is copied onto a copy paper sheet, the image is shifted on the copy paper sheet from a position of the image on the original document. To this end, a method has been employed in which on the basis of a point of time of displacement of the original scanning means to the leading edge of the copy paper sheet, a point of time at the start of transport of the copy paper sheet is set in a time period during constant speed displacement of the original scanning means.

FIG. 3 is a view explanatory of the construction and operation of a movable optical system type copying apparatus. In FIG. 3, an optical unit is included by a first mirror 1, a second mirror 2 and a third mirror 3 and is displaced so as to scan an image of an original document (not shown) placed on an original platform 7. A photosensitive drum 6 is disposed below the optical unit and a paper start clutch PSC is disposed adjacent to the photosensitive drum 6. A copy paper sheet (not shown) is temporarily stopped by the paper start clutch PSC so as to be further conveyed at a predetermined timing. Characters L1 and L2 denote a circumferential distance between an exposure position P4 and a transfer position P5 of the photosensitive drum 6 and a distance between a position P6 of the paper start clutch PSC and the transfer position P5 of the photosensitive drum 6, respectively. In the copying apparatus of the above described arrangement, a timer (not shown) is actuated at the time of displacement of the first mirror 1 to a point P2 and the paper start clutch PSC is controlled upon lapse of a preset time of the timer such that the image of the original document can be shifted on the copy paper sheet through a maximum distance of (L1-L2) from a position of the image on the original document. The maximum distance of (L1-L2) is approximately 10 to 20 mm at most and thus, the image cannot be shifted on the copy paper sheet through a large distance from the corresponding position of the image on the original document. In the case where the image is copied onto the copy paper sheet by shifting the image on the copy paper sheet through a large distance from the position of the image on the original document, for example, centering copying is performed in which the image is copied onto a central portion of the copy paper sheet at a reduction ratio, it has been necessary to start scanning of the original scanning means upon lapse a predetermined time period after the start of transport of the copy paper sheet. In this case, timing control of the original scanning means is required to be performed in consideration of a time period except for the time period during constant speed displacement of the original scanning means, i.e. a time period during which the original scanning means is displaced from a home position to a reference position such as a front end of the original document.

However, since a scanning start position, i.e. a stop position of the original scanning means varies according to the previous scanning of the original scanning means, relative positions of the leading edge of the copy paper sheet and the front end of the image may change, thereby resulting in such a problem that the image cannot be accurately copied onto a predetermined position of the copy paper sheet.

SUMMARY OF THE INVENTION

Accordingly, an essential object of the present invention is to provide a copying apparatus in which variations of a scanning start position of an original scanning means are minimized in a mode for starting scanning of the original scanning means after the start of transport of a copy paper sheet, with substantial elimination of the disadvantages inherent in conventional copying apparatuses of this kind.

In order to accomplish this object of the present invention, a copying apparatus embodying the present invention includes an original scanning means adapted to be reciprocated such that relative positions of a leading edge of a copy paper sheet and a front end of an image to be copied are controlled in accordance with a time interval between a point of time at the start of scanning of the original scanning means and a point of time at the start of transport of the copy paper sheet, the improvement comprising, means for reciprocating, in a mode for starting scanning of the original scanning means after start of transport of the copy paper sheet, the original scanning means through a short distance at a low speed prior to the start of copying of the image onto the copy paper sheet so as to determine a start position for scanning of the original scanning means.

In accordance with the present invention, when centering copying, for example, is performed, the image can be accurately copied onto a central portion of the copy paper sheet.

Furthermore, in accordance with the present invention, since the above described reciprocating motion of the original scanning means is not performed in a mode for starting transport of the copy paper sheet after the start of scanning of the original scanning means, a time period required for copying the image onto a single copy paper sheet does not become long.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

A copying apparatus according to one preferred embodiment of the present invention has the functions of centering copying, shift copying and ordinary copying. In the copying apparatus of the present invention, an original scanning means is reciprocated through a short distance at a low speed prior to the start of a copying operation of the copying apparatus in the case of centering copying and shift copying. Meanwhile, in the copying apparatus of the present invention, an acceleration time for displacing the original scanning means from a home position to a reference position such as a front end of an original document is obtained by preliminary scanning performed immediately after turning on of a power source of the copying apparatus. Thus, in the case where an actual copying operation is performed by the copying apparatus of the present invention, a time interval between a point of time at the start of scanning of the original scanning means and a point of time at the start of transport of a copy paper sheet is calculated in view of the acceleration time.

(A) Point of Time at the Start of Scanning of the Original Scanning Means and Point of Time at the Start of Transport of a Copy Paper Sheet:

Since the scanning speed of the original scanning means varies according to copying magnifications, a time period required for displacing the original scanning means from the home position to the reference position such as the front end of the original document changes according to copying magnifications.

Figure 1:
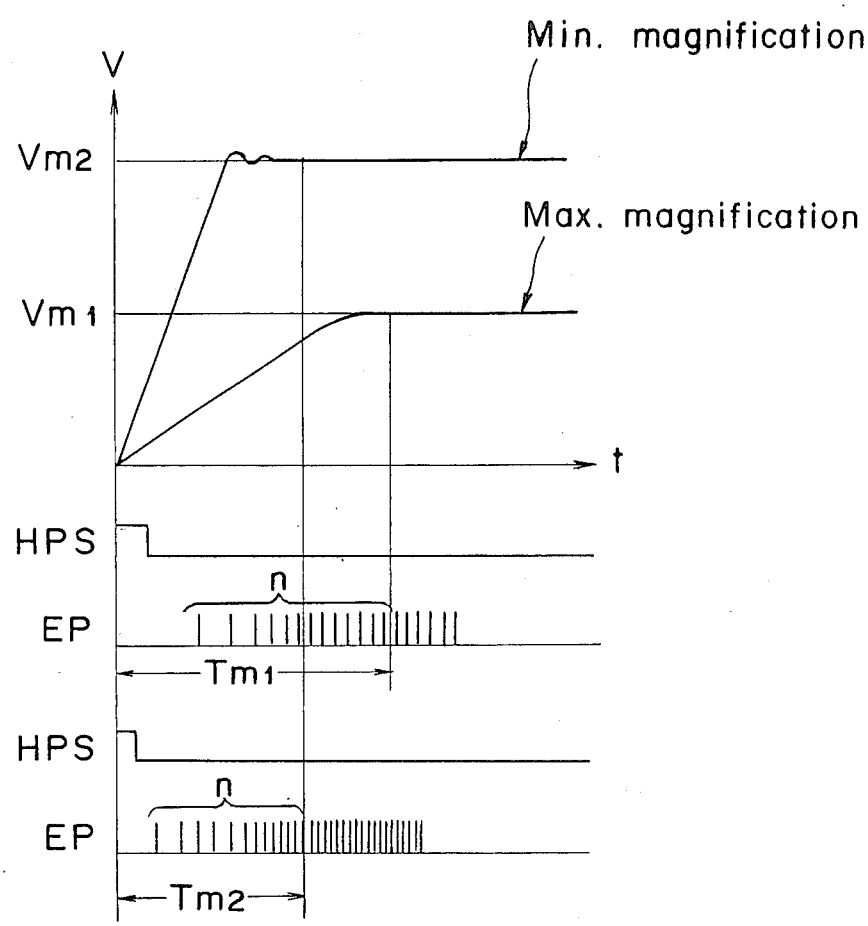
FIG. 1 is a graph explanatory of acceleration time of an original scanning means at different copying magnification.

FIG. 1 shows one example of a relationship between the acceleration time and the copying magnification. In FIG. 1, characters Vm1 denote a scanning speed of the original scanning means at a maximum copying magnification m1, while characters Vm2 denote a scanning speed of the original scanning means at a minimum copying magnification m2. As can be seen from FIG. 1, as the scanning speed of the original scanning means is increased, the original scanning means reaches a constant speed at an earlier point of time owing to its driving characteristics. Characters HPS represent a home position switch. When the original scanning means has passed through the home position switch HPS, the home position switch HPS is turned off. Meanwhile, characters EP designate pulses detected by a rotary disc formed with slits, i.e. a rotary encoder mounted on a driving system for driving the original scanning means. When the pulses EP have been counted to n (n = natural number) after the start of the original scanning means, the original scanning means is disposed at the reference position. Namely, characters Tm1 denote an acceleration time required for displacing the original scanning means from the home position to the reference position at the maximum copying magnification m1, while characters Tm2 denote an acceleration time required for displacing the original scanning means from the home position to the reference position at the minimum copying magnification m2.

Figure 2:
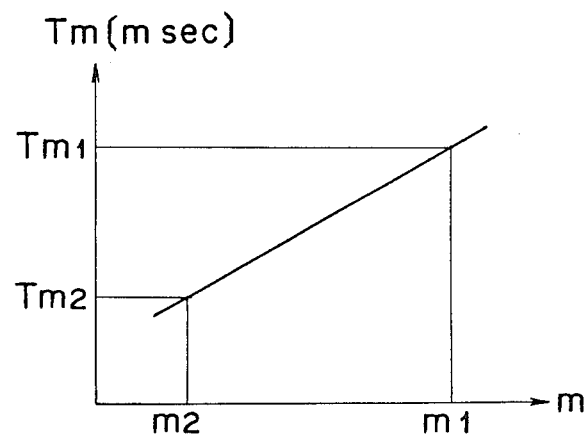
FIG. 2 is a graph indicative of a relationship between the acceleration time and the copying magnification.

By obtaining time periods required for displacing the original scanning means from the home position to the reference position at not less than two different copying magnifications, it is possible to determine an acceleration time at an arbitrary copying magnification as shown in FIG. 2.

As shown in FIG. 2, the copying magnification and the acceleration time are expressed by a linear function. Thus, an acceleration time Tm at an arbitrary copying magnification m is given by the following equation (1).

$$Tm = Tm2 + (Tm1 - Tm2) \times (m - m2)/(m1 - m2) \quad (1)$$

Figure 3:
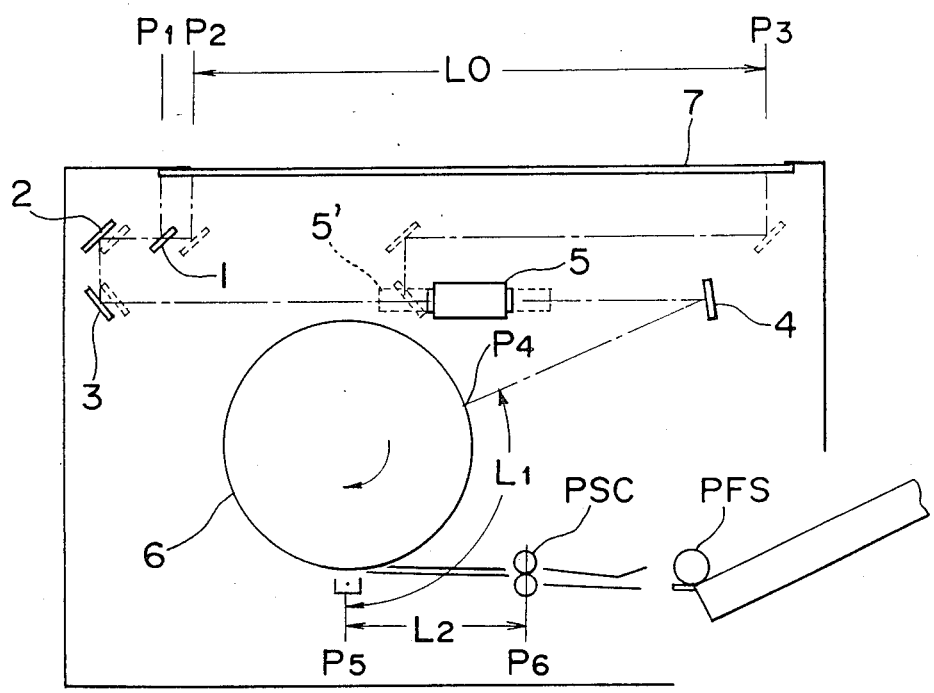
FIG. 3 is a schematic sectional view of a movable optical system type copying apparatus to which the present invention may be applied.

Referring to FIG. 3, there is shown a movable optical system type copying apparatus to which the present invention may be applied. In FIG. 3, an optical unit includes a first mirror 1, a second mirror 2 and a third mirror 3 and is displaced so as to scan an image of an original document (not shown) placed on an original platform 7. A photosensitive drum 6 is disposed below the optical unit and a paper start clutch PSC is disposed adjacent to the photosensitive drum 6. A copy paper sheet (not shown) is temporarily stopped by the paper start clutch PSC so as to be further conveyed at a predetermined timing. Meanwhile, characters PFS denote a paper feeding solenoid for actuating a paper feeding roller. In FIG. 3, the original scanning means is constituted by the reciprocating optical unit. However, in the case of a movable original platform type copying apparatus, the original scanning means is constituted by the reciprocating original platform.

On the basis of a sum of the acceleration time Tm of the equation (1) and a time period required for rotating the photosensitive drum 6 from an exposure position P4 to a transfer position P5 in FIG. 3, it becomes possible to determine timing of the transport of the copy paper sheet. Namely, a time interval $\Delta T$ between a point of time at the start of scanning of the original scanning means and a point of time at the start of transport of the copy paper sheet is expressed by the following equation (2).

$$\Delta T = Tm + (L1 - L2)/VO \quad (2)$$

where characters L1 denote a circumferential distance between the exposure position P4 and the transfer position P5, characters L2 denote a distance between a position P6 of the paper start clutch PSC and the transfer position P5 and characters VO denote a peripheral speed of the photosensitive drum 6, i.e. a transport speed of the copy paper sheet.

A transfer position of the image on the copy paper sheet is determined by the time interval $\Delta T$. Thus, if timing of transport of the copy paper sheet is controlled by adding to the time interval $\Delta T$ or subtracting from the time interval ΔT a time period required for shifting the image on the copy paper sheet, a desired shift of the image copied onto the copy paper sheet can be performed.

For example, assuming that a distance of shift of the image on the copy paper sheet is SH, a time period required for transporting the copy paper sheet through the distance SH is expressed by (SH/VO). Hence, at this time, a time interval ΔTS between a point of time at the start of scanning of the original scanning means and a point of time at the start of transport of the copy paper sheet in the case of shift copying is given by the following equation (3).

$$\Delta TS = \Delta T - SH/VO \quad (3)$$

Supposing that a character D denotes a size of the original document (its width in the direction of scanning of the original scanning means), a character S denote a size of the copy paper sheet and a character m denotes a copying magnification, a distance from the leading edge of the copy paper sheet to the front end of the image to be copied is expressed by $(S - m \times D)/2$ in the case of centering copying for copying the image at a central portion of the copy paper sheet. Therefore, a time interval ΔTC between a point of time at the start of scanning of the original scanning means and a point of time at the start of transport of the copy paper sheet in the case of centering copying is given by the following equation (4).

$$\Delta TC = \Delta T - (S - m \times D)/2VO \quad (4)$$

Figure 8:
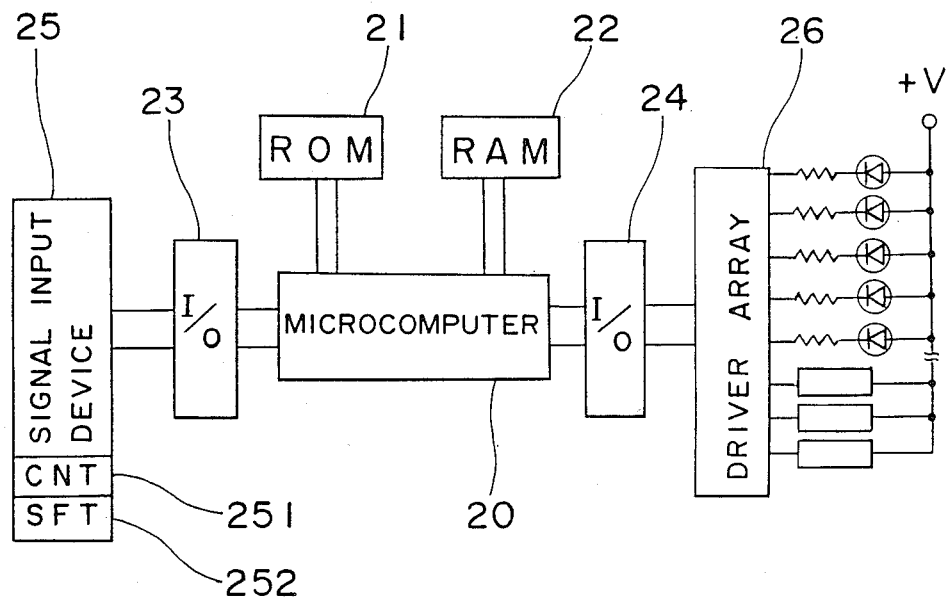
FIG. 8 is a block diagram of a control portion of the copying apparatus of the present invention.

(B) Control Portion:

FIG. 8 shows a control portion employed in the copying apparatus according to the present invention. The control portion includes a microcomputer 20, a read-only memory (ROM) 21, a random access memory (RAM) 22, a signal input device 25, an interface circuit 23 for the signal input device 25, a driver array 26 for controlling various displays such as a display of the copying magnification and an interface circuit 24 for the driver array 26. The microcomputer 20 executes predetermined controls in accordance with a control program stored preliminarily in the ROM 21. Meanwhile, the RAM 22 is used as a buffer memory and for storing flags and performing other calculations. The signal input device 25 includes key switches and a copy paper detecting switch. Numerals 251 designate a centering key for commanding centering copying for copying the image at a central portion of the copy paper sheet, while numerals 252 designate a shift key for commanding shift copying for shifting the image on the copy paper sheet from the position of the image on the original document.

Figure 4:
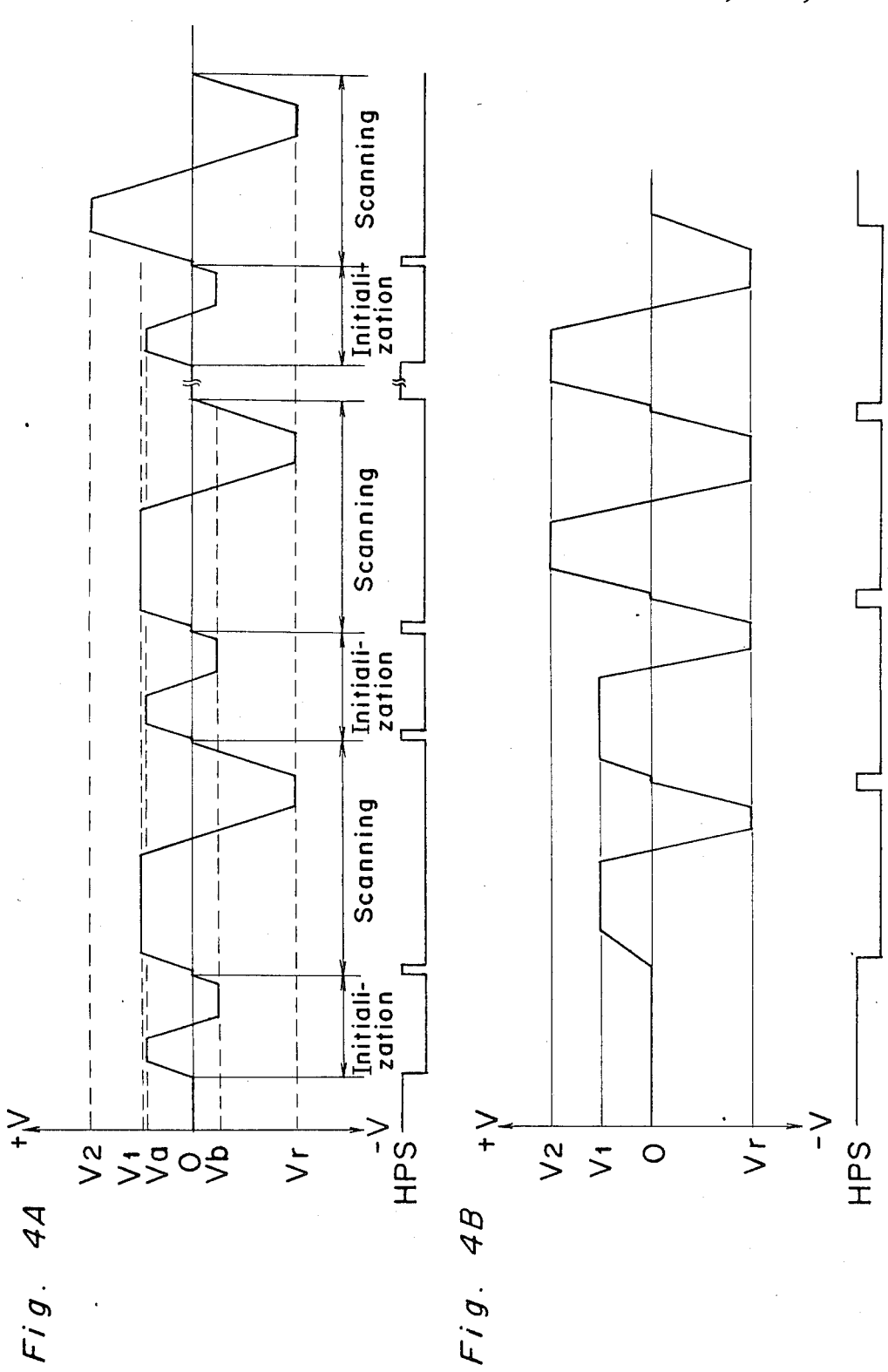
FIGS. 4A and 4B are graphs indicative of a relationship between a scanning speed of the original scanning means and a signal of a home position switch.

(C) Initialization of Original Scanning Means:

FIG. 4A shows an essential feature of the present invention in connection with a speed pattern of displacement of the original scanning means (optical unit) and signals of the home position switch HPS. In FIG. 4A, characters V1 denote a scanning speed at the maximum magnification m1, while characters V2 denote a scanning speed at the minimum magnification m2. Furthermore, characters Vr denote a return speed of the optical unit. During initialization of the original scanning means, the original scanning means is reciprocated prior to a copying operation. Namely, the original scanning means is displaced beyond the home position at a speed Va and then, is returned to a predetermined position at a speed Vb which is far smaller than the return speed Vr.

By reciprocating the original scanning means through a short distance at the low speed prior to the copying operation as described above, a stop position of the original scanning means, i.e. a scanning start position of the original scanning means at the time of the next copying operation can be set at a fixed position. Accordingly, immediately after the original scanning means has been reciprocated as described above, variations in a time period for displacing the original scanning means from the stop position to a reference position such as the front end of the original document can be minimized.

Meanwhile, the above described reciprocation of the original scanning means is performed after the start of transport of the copy paper sheet and prior to the start of scanning of the original scanning means. However, in the case where ordinary copying in which the leading edge of the copy paper sheet coincides with the front end of the image is performed, the above described reciprocation of the original scanning means is not performed. Namely, in the case of ordinary copying, timing of transport of the copy paper sheet is controlled such that the copy paper sheet is transported upon detection of rotation of the photosensitive drum 6 through a predetermined angle after displacement of the original scanning means beyond the home position.

Figure 9A:
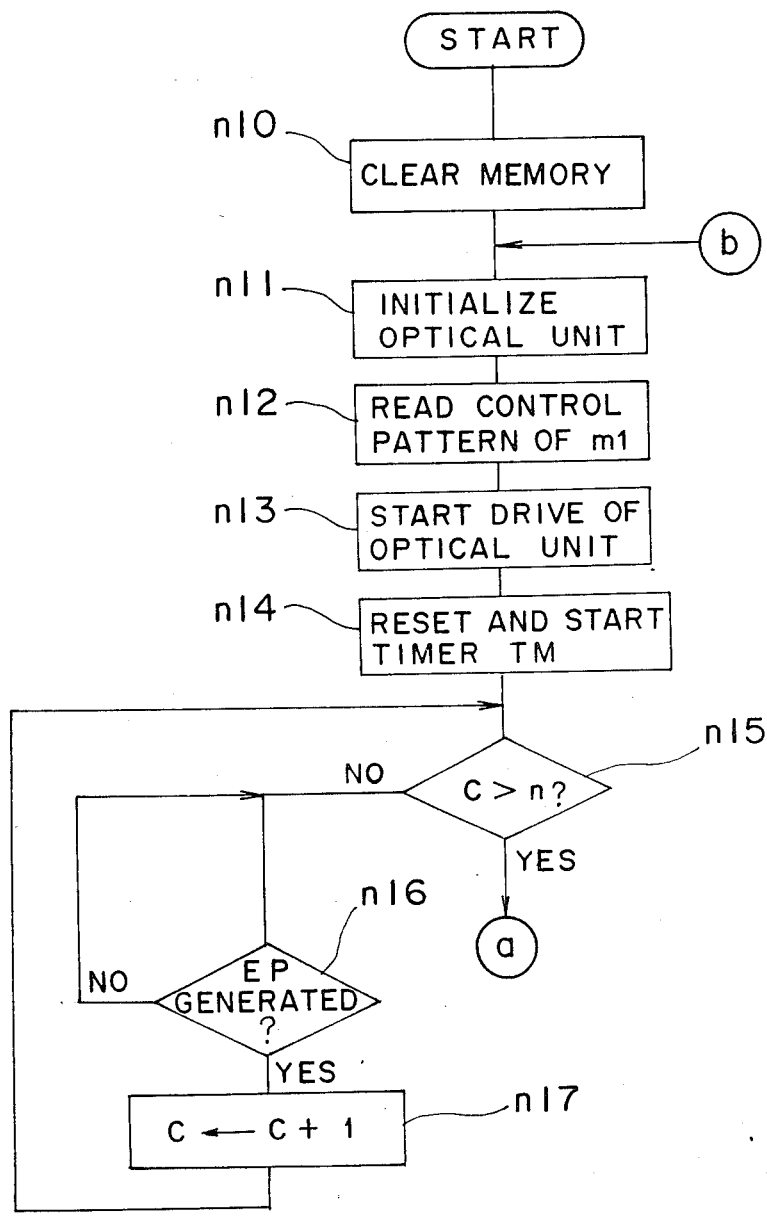
FIGS. 9A, 9B and 9C are flow charts showing a processing sequence of the copying apparatus of the present invention after turning on of its power source.
Figure 9B:
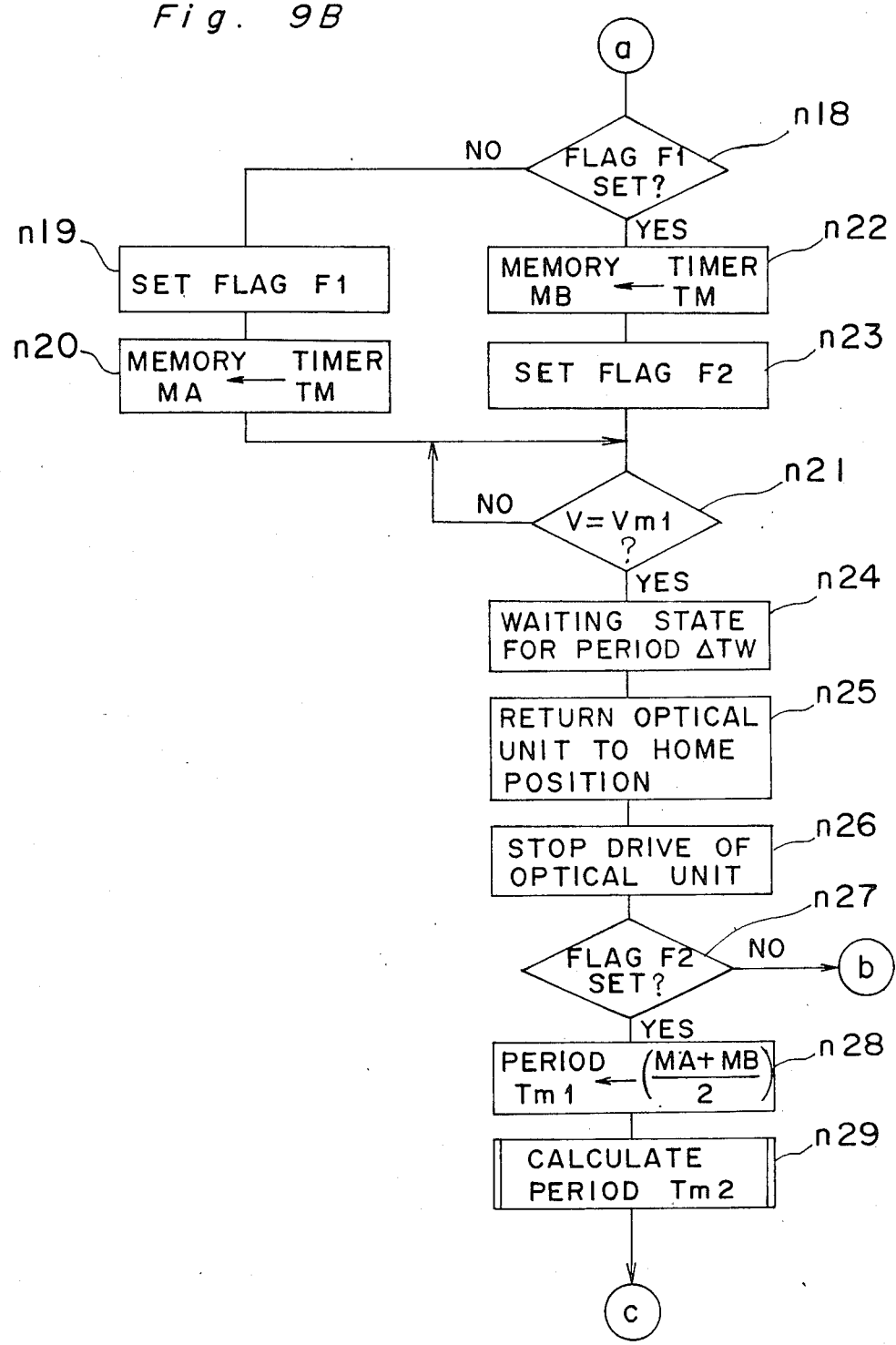

(D) Processing Immediately After Turning on of Power Source:

FIGS. 9A and 9B are flow charts for obtaining time periods required for displacing, at the two different copying magnifications as described earlier with reference to FIGS. 1 and 2, the original scanning means to the reference position after the start of scanning of the original scanning means.

Initially, after a power source of the copying apparatus has been turned on, a memory is cleared at step n10. Then, at step n11, the optical unit is initialized as describe above so as to be stopped at a predetermined stop position in the home position. Subsequently, at step n12, a control pattern for the copying magnification m1 is read from the memory. This control pattern is control data determined beforehand in accordance with the copying magnification such that scanning of the original scanning means is performed on the basis of the control data. Namely, at step n13, a motor for driving the optical unit is turned on. Then, at step n14, a timer TM is reset and is started for a timing operation. At step n16, a decision is made as to whether or not a value of a counter C has reached a preset number n. Meanwhile, at step n16, a decision is made as to whether or not the pulses EP (FIG. 1) detected by the rotary encoder are generated. In the case of "YES" at step n16, one is added to the value of the counter C at step n17. Namely, by steps n15 to n17, the counter C performs a counting operation until the value of the pulses EP reaches the number n.

As shown in FIG. 9B, a decision is made at step n18 as to whether or not a flag F1 is in a set state. Since the flag F1 is in a reset state initially, the flag F1 is set at step n19 and then, the value of the timer TM, i.e. a time period required for processing of the loop from the step n15 to step n17 is stored in a memory MA. The value of the timer TM corresponds to the acceleration time Tm1 of FIG. 1. Then, at step n21, a decision is made as to whether or not the optical unit has reached a constant speed, i.e. the scanning speed Vm1 of FIG. 1. Thereafter, at step n24, the copying apparatus is set in a waiting state for a time period ΔTW required for stabilizing a driving system for driving the optical unit. Subsequently, at steps n25 and n26, the optical unit is returned to the home position. Then, at step n27, a decision is made as to whether or not a flag F2 is in a set state. Since the flag F2 is in a reset state at this time, the program flow returns to step n11. Thus, the same operations as described above are performed. However, since the flag F1 is in the set state at this time, it is found at step n18 that the flag F1 is in the set state, so that the value of the timer TM is stored in a memory MB at step n22 and then, the flag F2 is set at step n23. Therefore, it is found at step n27 that the flag F2 is in the set state. Then, at step n28, an average of the values stored in the memories MA and MB is obtained and is set at the acceleration time Tm1. At step n29, the same operations as described above are performed for the copying magnification m2 such that an average acceleration time is set at the acceleration time Tm2.

FIG. 4B shows a speed pattern of preliminary scanning of the original scanning means (optical unit). As shown in FIG. 4B, preliminary scanning is performed twice at the scanning speed corresponding to the copying magnification m1 and then, scanning is performed twice at the scanning speed corresponding to the copying magnification m2. Meanwhile, in FIG. 4B, the return speed Vr of the optical unit is constant regardless of the copying magnification because the optical unit does not contribute to formation of the image during return of the optical unit.

Figure 9C:
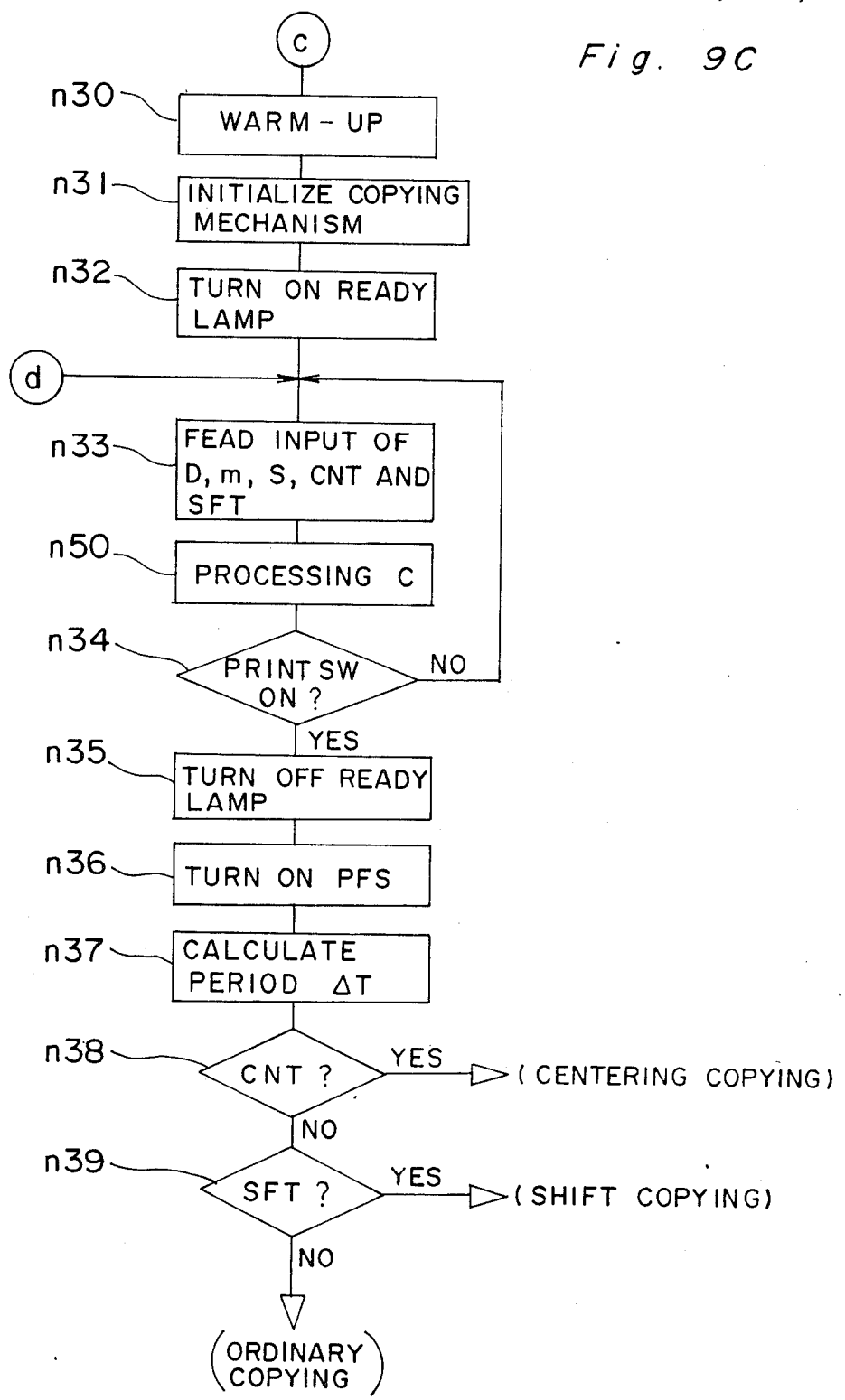

FIG. 9C shows a processing subsequent to the above described preliminary scanning of the optical unit. In Fig. 9C, warm-up of fixing rollers (not shown) is initially performed at step n30 and then, each portion of a copying mechanism in the copying apparatus is initialized at step n31. Subsequently, at step n32, a ready lamp for displaying a state enabling copying is turned on. Then, at step n33, input signals of the size D of the original document, the copying magnification m, the size S of the original document, a command of centering copying and a command of shift copying are read. These data can be input to the copying apparatus from a keyboard or can be detected automatically. Then, at step n50, processings C for determining whether or not copying can be performed on the basis of these read data, for obtaining a time period required for scanning of the original scanning means, etc. are performed. Thereafter, a decision is made at step n34 as to whether or not a print switch has been turned on. In the case of "YES" at step n34, the ready lamp is turned off at step n35 and then, the paper feeding solenoid PFS (FIG. 3) for actuating the paper feeding roller is turned on at step n36. Then, at step n37, the time interval ΔT is calculated. Subsequently, a decision is made at steps n38 and n39 as to whether or not copying is centering copying or shift copying, respectively.

Figure 10:
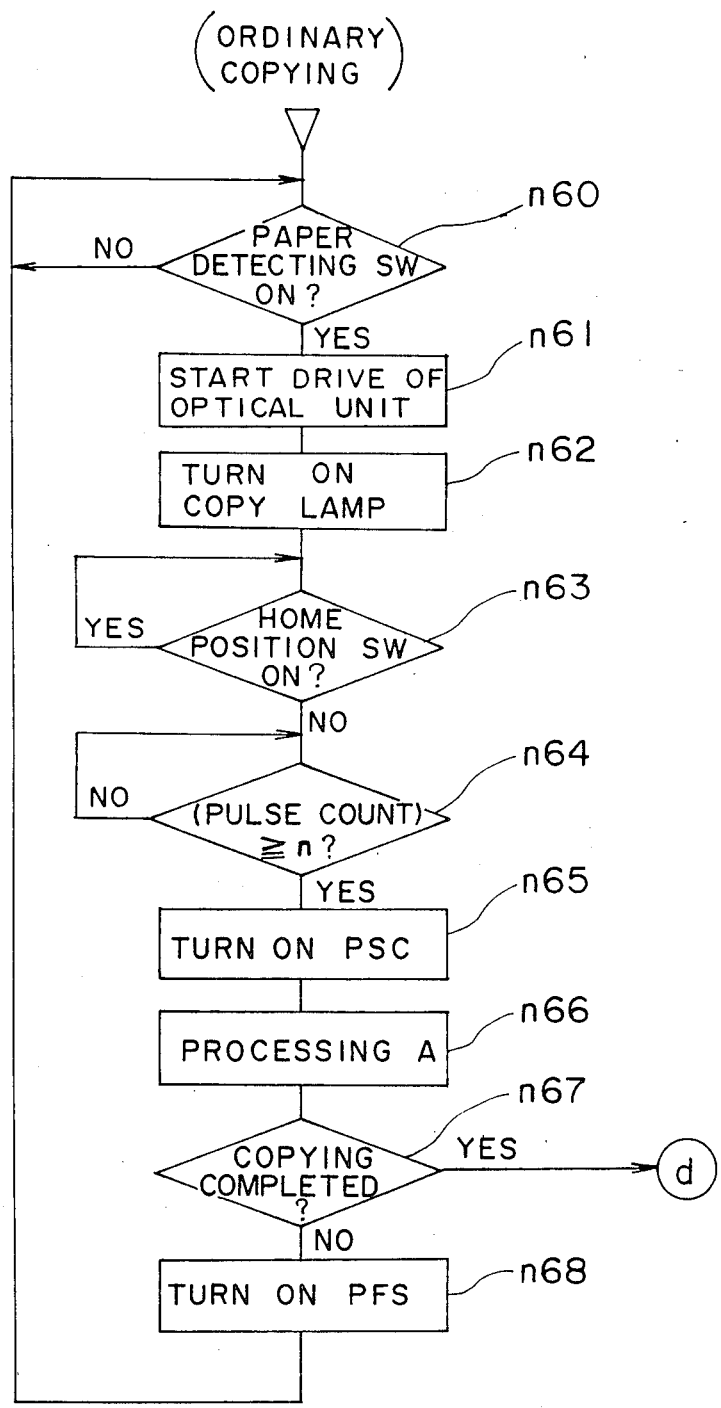
FIG. 10 is a flow chart showing a processing sequence of ordinary copying of the copying apparatus of the present invention.

(E) Ordinary Copying:

FIG. 10 shows a processing sequence of the copying apparatus at the time of ordinary copying. In FIG. 10, at step n60, a decision is made as to whether or not the copy paper detecting switch is in an ON state. The copy paper detecting switch detects the copy paper sheet upon detection of the copy paper sheet in contact with the paper start clutch PSC of FIG. 3. Thus, if the copy paper sheet is held in contact with the paper start clutch PSC, scanning of the optical unit is started at step n61 and then, a copy lamp is turned on at step n62. Subsequently, a decision is made at step n63 as to whether or not the home positions switch HPS is in an ON state. When the home position switch HPS has passed through the home position, the home position switch HPS is turned off. In response to the start of scanning of the optical unit, rotation of the photosensitive drum 6 is started. After the home position switch HPS has been turned off, counting of the pulses EP is started. When it is found at step n64 that a count of the pulses EP has reached the number n or more, the paper start clutch PSC is turned on so as to start of transport the the copy paper sheet to the transfer position P5. Then, at step n66, processings A for transferring the image onto the transported copy paper sheet and discharging finally the copied copy paper sheet onto a copy receiving tray are performed. Subsequently, a decision is made at step n67 as to whether or not copying of a necessary number of the copy paper sheets has been completed. In the case of "NO" at step n67, the paper feeding solenoid PFS is turned on at step n68 and then, the program flow returns to step n60 such that the above described operations are repeated. On the contrary, in the case of "YES" at step n67, the program flow returns to step n33 of FIG. 9C.

As described above, ordinary copying can be performed at a timing which is determined by the number of the pulses EP counted after passing of the optical unit beyond the home position in response to the start of scanning of the optical unit and by values of the distances L1 and L2 and a coupling time of the paper start clutch PSC.

Figure 11:
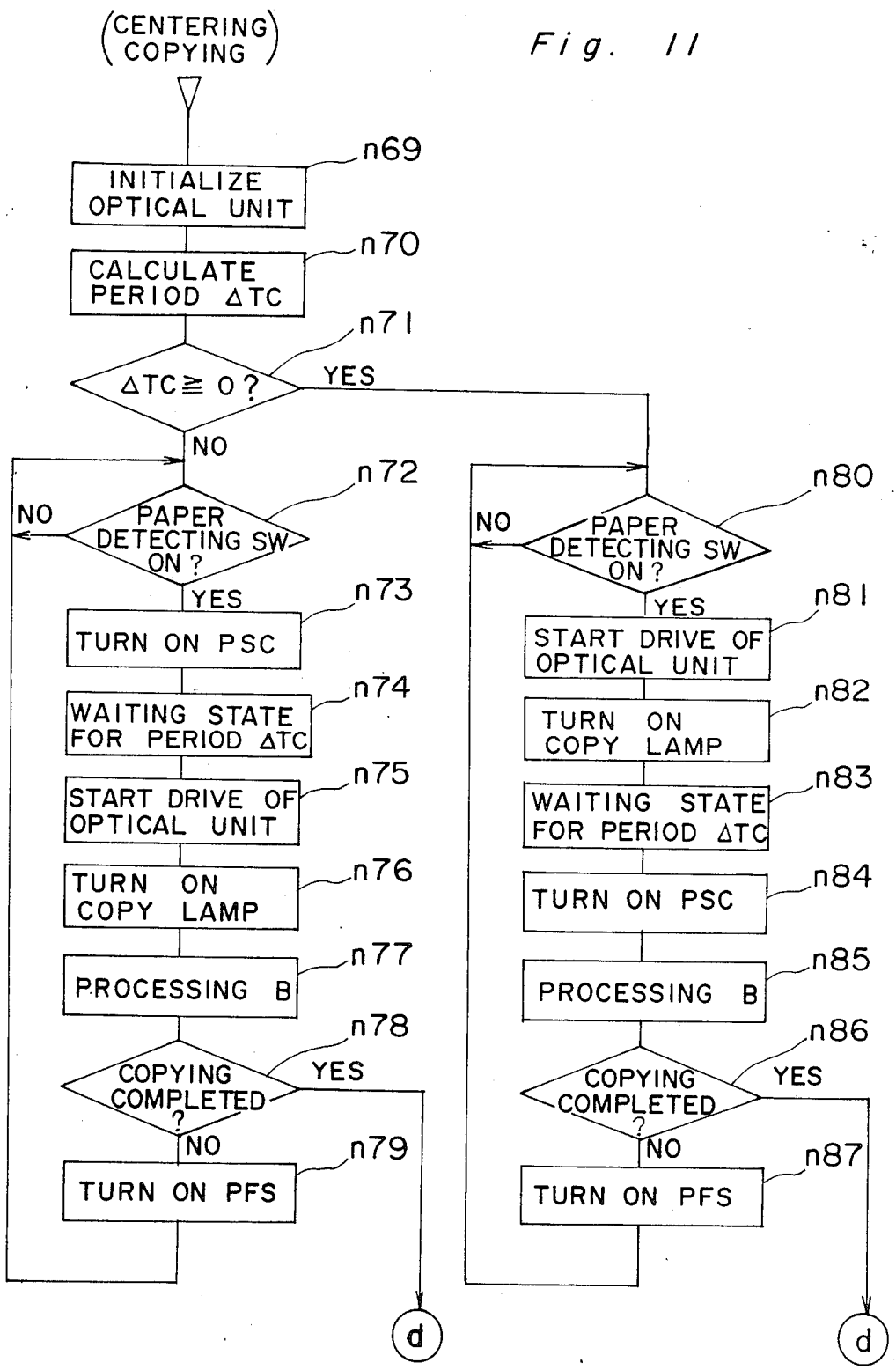
FIG. 11 is a flow chart showing a processing sequence of centering copying of the copying apparatus of the present invention.

(F) Centering Copying:

FIG. 11 shows a processing sequence for centering copying. In FIG. 11, the optical unit is first initialized at step n69. Namely, the same processing as step n11 of FIG. 9A is performed such that the optical unit is stopped at a predetermined stop position in the home position. Then, at step n70, the time interval ΔTC is calculated. If it is found at step n71 that the value of the time interval ΔTC is negative, a decision is made at step n72 as to whether or not the paper detecting switch is in an ON state. In the case of "YES" at step n72 in response to contact of the copy paper sheet with the paper start clutch PSC, the paper start clutch PSC is turned on so as to start transport of the copy paper sheet. Subsequently, at step n74, the copying apparatus is set in a waiting state for the time interval ΔTC obtained at step n70. Upon lapse of the time interval ΔTC, scanning of the optical unit is started at step n75 and then, the copy lamp is turned on at step n76. Thereafter, at step n77, processings B for transferring the image onto the transported copy paper sheet and discharging finally the copied copy paper sheet onto the copy receiving tray are performed. Subsequently, a decision is made at step n78 as to whether or not copying of a necessary number of the copy paper sheets has been completed and then, the paper feeding solenoid is turned on at step n79 in the case of "NO" at step n78 in the same manner as steps n67 and n68 of FIG. 10. Thus, if the value of the time interval ΔTC is negative, the image can be transferred onto the central portion of the copy paper sheet by scanning of the optical unit upon lapse of the absolute value of the time interval ΔTC.

On the other hand, if it is found at step n71 that the time interval ΔTC is not less than zero, a decision is made at step n80 as to whether or not the paper detecting switch is in the ON state. In the case of "YES" at step n80, scanning of the optical unit is started at step n81 and then, the copy lamp is turned on at step n82. Thereafter, at step n83, the copying apparatus is set in a waiting state for the time interval $\Delta TC$. Upon lapse of the time interval $\Delta TC$, the paper start clutch PSC is turned on at step n84 so as to start transport of the copy paper sheet. Thus, if the value of the time interval $\Delta TC$ is positive, the image can be transferred onto the central portion of the copy paper sheet by starting transport of the copy paper sheet upon lapse of the time interval $\Delta TC$ after scanning of the optical unit such that the central portion of the copy portion sheet corresponds to the central portion of the original document.

Figure 12:
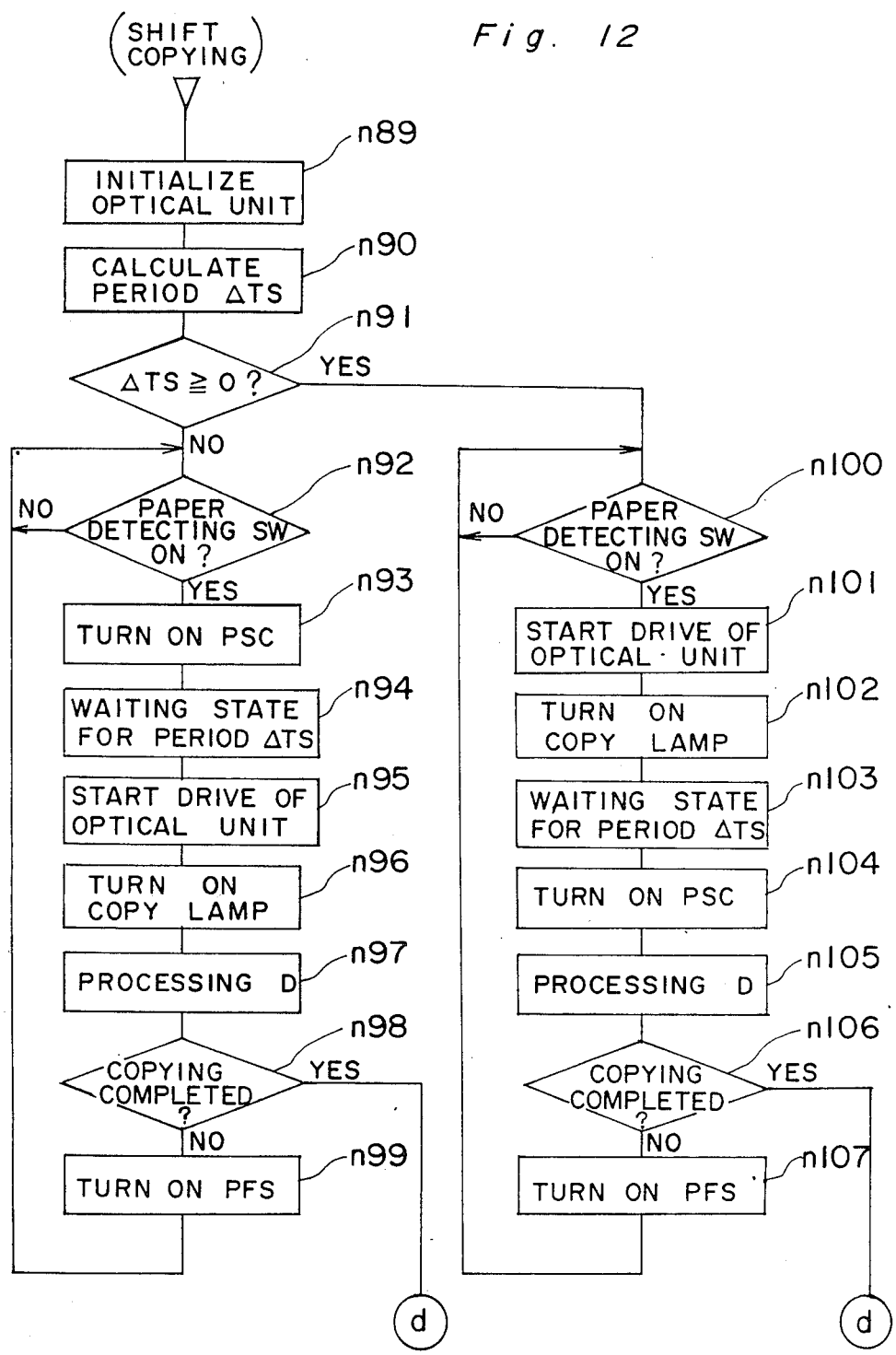
FIG. 12 is a flow chart showing a processing sequence of shift copying of the copying apparatus of the present invention.

(G) Shift Copying:

FIG. 12 shows a processing sequence for shift copying. In FIG. 12, at step n89, the optical unit is first initialized. Namely, in the same manner as step n11 of FIG. 9A, the optical unit is stopped at a predetermined position in the home position. Then, at step n90, the time interval $\Delta TC$ is calculated. The time interval $\Delta TC$ is obtained by calculating, on the basis of the equation (3) referred to earlier, a time period corresponding to a value of shift inputted through ten keys at step n33 of FIG. 9C. If it is found at step n91 that the value of the time interval $\Delta TC$ is negative, processing from n92 follows. On the other hand, if it is found at step n91 that the value of the time interval $\Delta TC$ is positive, processing from n100 follows. Since these processings are the same as those of centering copying of FIG. 11 except for the waiting time, description thereof is abbreviated for the sake of brevity.

Figure 5:
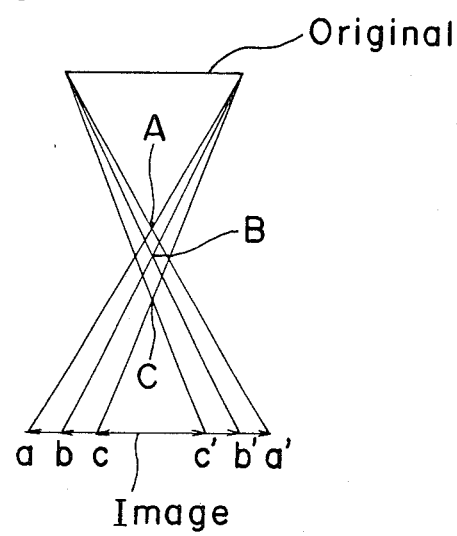
FIG. 5 is a view indicative of a relationship between an original document and an image at various copying magnifications.

(H) Scanning Distance of Optical Unit:

FIG. 5 shows relation between the original document and the image on the photosensitive drum at various copying magnifications. As will be apparent from FIG. 5, when a lens is disposed at a position A, the image on the photosensitive drum has a size a—a'. Meanwhile, when the lens is disposed at a position B, the image on the photosensitive drum has a size b—b'. When the lens is disposed at a position C, the image on the photosensitive drum has a size c—c'.

Figures 6, 7:
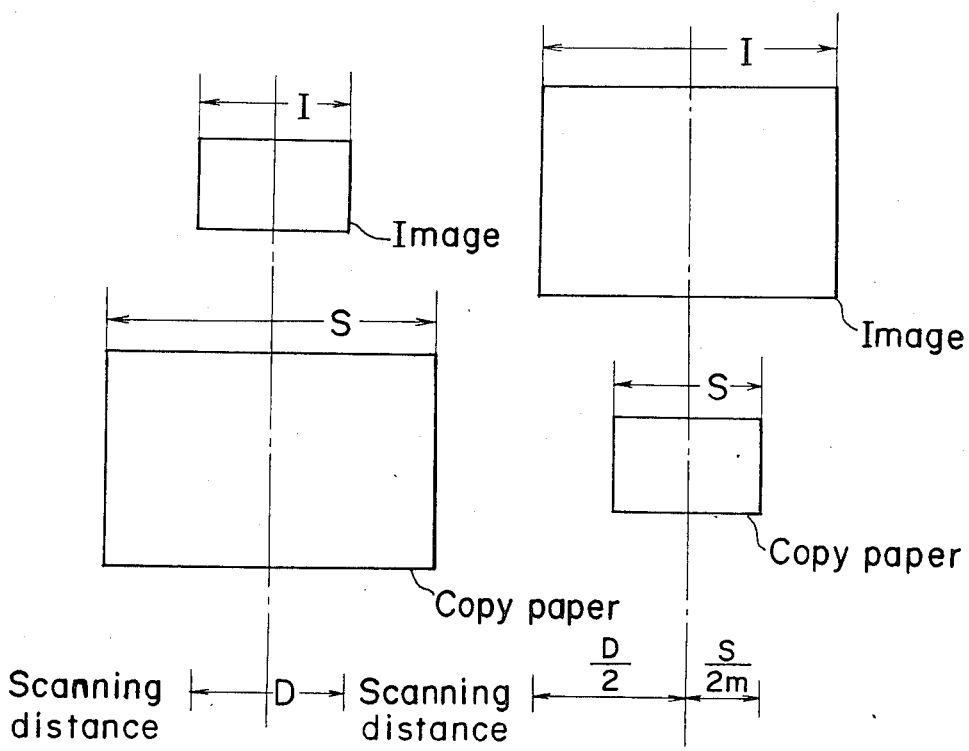
FIGS. 6 and 7 are views indicative of relationships between the image, a copy paper sheet and a scanning distance of the original scanning means.

FIGS. 6 and 7 show the relationship between the image, the copy paper sheet and a scanning distance of the original scanning means. As shown in FIG. 6, in the case where a size I of the image is smaller than a size S of the copy paper sheet, a distance corresponding to the size I of the image, i.e. a size D of the original document is scanned by the optical unit, whereby the image can be transferred onto the central portion of the copy paper sheet. Meanwhile, in the case where the size I of the image on the photosensitive drum is larger than the size S of the copy paper sheet as shown in FIG. 7, a distance corresponding to a value of (I/2), i.e. a distance of (D/2) is required to be scanned by the optical unit in order to expose a front half portion (left half portion in FIG. 7) of the image on the photosensitive drum. However, in the case of a rear half portion (right half portion) of the image, since it is only necessary to expose an image portion required to be transferred onto a rear half portion (right half portion) of the copy paper sheet, a scanning distance of the optical unit assumes a value of (S/2 m). Thus, an overall scanning distance of the optical unit assumes a value of $(D+S/m)/2$.

By the above described arrangement of the copying apparatus of the present invention, in the case where a point of time of start of scanning of the original scanning means is controlled at the time of centering copying or shift copying on the basis of the time period required for displacing the original scanning means from its stop position to the reference position such as the front end of the original document after the start of scanning of the original scanning means such that the original scanning means is displaced at the reference position at a constant scanning speed, variations in the stop position of the original scanning means can be minimized and the image can be copied at a predetermined position of the copy paper sheet accurately.

Furthermore, in accordance with the present invention, ordinary copying can be performed efficiently without a decrease in the number of copies to be taken during a unit time.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a copying apparatus including an original scanning means adapted to be reciprocated such that relative positions of a leading edge of a copy paper sheet and a front end of an image to be copied are controlled in accordance with a time interval between a point of time of start of scanning of said original scanning means and a point of time of start of transport of the copy paper sheet, the improvement comprising:

means for reciprocating, in a mode for starting scanning of said original scanning means after start of transport of the copy paper sheet, said original scanning means through a short distance at a low speed prior to start of copying of the image onto the copy paper sheet so as to determine a start position of scanning of said original scanning means.

2. A copying apparatus as claimed in claim 1, wherein said original scanning means is an optical unit constituted by a first mirror, a second mirror and a third mirror.

3. A copying apparatus as claimed in claim 2, wherein said means includes a microcomputer, a read-only memory, a random access memory, a signal input device and a driver array.

* * * * *